US008413911B2

(12) United States Patent
Munn

(10) Patent No.: US 8,413,911 B2
(45) Date of Patent: Apr. 9, 2013

(54) PAINT SPRAYER

(75) Inventor: Jamie S. Munn, Maitland (CA)

(73) Assignee: Black & Decker Inc., Newark, DE (US)

( * ) Notice: Subject to any disclaimer, the term of this patent is extended or adjusted under 35 U.S.C. 154(b) by 207 days.

(21) Appl. No.: 12/898,293

(22) Filed: Oct. 5, 2010

(65) Prior Publication Data

US 2011/0114749 A1 May 19, 2011

Related U.S. Application Data

(60) Provisional application No. 61/261,953, filed on Nov. 17, 2009.

(51) Int. Cl.

*B67D 7/08* (2010.01)
*B67D 7/56* (2010.01)
*B05B 7/32* (2006.01)
*B05B 7/02* (2006.01)
*A01G 25/14* (2006.01)

(52) U.S. Cl. .............. 239/74; 239/71; 239/73; 239/337; 239/375; 239/526; 239/DIG. 14

(58) Field of Classification Search .................. 239/290, 239/310, 315, 337, 339, 345, 350, 351, 375, 239/376, 415, 526, DIG. 14, 71, 73, 74
See application file for complete search history.

(56) References Cited

U.S. PATENT DOCUMENTS 1,703,384 A * 2/1929 Birkenmaier ................. 239/301
1,799,143 A 4/1931 Bailey
1,807,490 A 5/1931 Milner
1,919,233 A 7/1933 Lee
2,098,014 A 11/1937 Polston
2,105,681 A 1/1938 Armstrong
2,455,240 A 11/1948 Dupler
(Continued)

FOREIGN PATENT DOCUMENTS

CN 1150396 A 5/1997
CN 1640561 A 7/2005
(Continued)

OTHER PUBLICATIONS

PCT International Search Report and Written Opinion for International Appln. No. PCT/US2010/057042 dated Apr. 21, 2011, 12 pages.

(Continued)

*Primary Examiner* — Ryan Reis
(74) *Attorney, Agent, or Firm* — Harness, Dickey & Pierce, P.L.C.

(57) ABSTRACT

A sprayer for spraying a fluid can include a sprayer body, a fluid reservoir, a trigger assembly, a flow adjustment mechanism and a flow rate indicator. The sprayer body can include a nozzle assembly that defines a fluid outlet and includes a needle arranged within a fluid conduit. The needle can be movable between a closed position and a fully opened position. The fluid reservoir can be coupled to the sprayer body and be in communication with the fluid outlet and fluid conduit. The trigger assembly can be coupled to the nozzle assembly and be configured to move the needle as the trigger assembly is depressed. The flow adjustment mechanism can be configured to adjust a flow rate of the sprayer by limiting movement of the trigger assembly and the needle. The flow rate indicator can provide an indication of the flow rate.

19 Claims, 13 Drawing Sheets

U.S. PATENT DOCUMENTS

| | | | |
|---|---|---|---|
| 2,456,493 A | | 12/1948 | Drane et al. |
| 2,540,357 A | | 2/1951 | Stanley |
| 2,888,207 A | | 5/1959 | Sykes |
| 3,191,869 A | | 6/1965 | Gilmour |
| 3,428,291 A | | 2/1969 | Callahan, Jr. et al. |
| 3,795,366 A | | 3/1974 | McGhie et al. |
| 3,816,165 A | | 6/1974 | Horvath et al. |
| RE29,055 E | | 11/1976 | Wagner |
| 4,106,181 A | | 8/1978 | Mattchen |
| 4,137,952 A | | 2/1979 | Rendemonti |
| 4,228,957 A | | 10/1980 | Davini |
| 4,245,784 A | | 1/1981 | Garcin |
| 4,278,205 A | | 7/1981 | Binoche |
| 4,349,947 A | | 9/1982 | Rood |
| 4,365,745 A | | 12/1982 | Beck |
| 4,433,799 A | | 2/1984 | Corsette |
| 4,442,977 A | | 4/1984 | Beiswenger et al. |
| 4,483,483 A | | 11/1984 | Grime |
| 4,501,500 A | | 2/1985 | Terrels |
| 4,537,357 A | | 8/1985 | Culbertson et al. |
| 4,551,037 A | | 11/1985 | Kille et al. |
| 4,569,366 A | | 2/1986 | West et al. |
| 4,569,503 A | | 2/1986 | Karr, Jr. |
| 4,692,049 A | | 9/1987 | Engle |
| 4,693,423 A | | 9/1987 | Roe et al. |
| 4,735,362 A | | 4/1988 | Trautwein et al. |
| 4,804,144 A | | 2/1989 | Denman |
| 4,811,904 A | | 3/1989 | Ihmels et al. |
| 4,884,742 A | | 12/1989 | Bekius et al. |
| 4,936,511 A | | 6/1990 | Johnson et al. |
| 4,971,251 A | | 11/1990 | Dobrick et al. |
| 4,993,596 A | | 2/1991 | Brown |
| 5,009,367 A | | 4/1991 | Nielsen |
| 5,033,552 A | | 7/1991 | Hu |
| 5,056,717 A | | 10/1991 | Koide |
| 5,057,342 A | | 10/1991 | Hoy et al. |
| 5,060,869 A | | 10/1991 | Bekius |
| 5,064,120 A | * | 11/1991 | Luttrell, Jr. .................... 239/74 |
| 5,090,623 A | | 2/1992 | Burns et al. |
| 5,119,992 A | | 6/1992 | Grime |
| 5,141,156 A | | 8/1992 | Hoy et al. |
| 5,217,168 A | | 6/1993 | Svendsen |
| 5,281,782 A | | 1/1994 | Conatser |
| 5,284,299 A | | 2/1994 | Medlock |
| 5,395,051 A | | 3/1995 | Anderson et al. |
| 5,582,350 A | * | 12/1996 | Kosmyna et al. ............ 239/345 |
| 5,609,302 A | | 3/1997 | Smith |
| 5,630,552 A | | 5/1997 | Anfindsen et al. |
| 5,687,913 A | | 11/1997 | Robisch et al. |
| 5,706,856 A | | 1/1998 | Lancaster |
| 5,779,157 A | | 7/1998 | Robisch et al. |
| 5,803,367 A | | 9/1998 | Heard et al. |
| 5,826,795 A | | 10/1998 | Holland et al. |
| 5,836,517 A | | 11/1998 | Burns et al. |
| 5,927,602 A | | 7/1999 | Robisch et al. |
| 5,934,887 A | | 8/1999 | Veit |
| 5,949,209 A | | 9/1999 | Okamoto et al. |
| 5,992,690 A | | 11/1999 | Tracy |
| 6,000,419 A | | 12/1999 | Bernhard |
| 6,009,899 A | | 1/2000 | Polutnik |
| 6,089,471 A | | 7/2000 | Scholl |
| 6,106,742 A | | 8/2000 | Argyropoulos et al. |
| 6,189,804 B1 | | 2/2001 | Vetter et al. |
| 6,247,995 B1 | | 6/2001 | Bryan |
| 6,263,980 B1 | | 7/2001 | Wadge |
| 6,286,611 B1 | | 9/2001 | Bone |
| 6,383,062 B1 | | 5/2002 | Jou |
| 6,390,386 B2 | | 5/2002 | Krohn et al. |
| 6,431,466 B1 | | 8/2002 | Kitajima |
| 6,527,200 B1 | | 3/2003 | Huang |
| 6,547,161 B1 | | 4/2003 | Huang |
| 6,553,642 B2 | | 4/2003 | Driessen |
| 6,623,561 B2 | | 9/2003 | Vetter et al. |
| 6,631,855 B2 | | 10/2003 | Huang |
| 6,675,911 B2 | | 1/2004 | Driessen |
| 6,702,203 B2 | | 3/2004 | Jou |
| 6,805,306 B1 | | 10/2004 | Huang |
| 6,824,075 B2 | | 11/2004 | Zimmermann |
| 6,874,702 B2 | | 4/2005 | Turnbull |
| 6,971,590 B2 | | 12/2005 | Blette et al. |
| 7,017,835 B2 | | 3/2006 | Vetter et al. |
| 7,021,399 B2 | | 4/2006 | Driessen |
| 7,032,839 B2 | | 4/2006 | Blette et al. |
| 7,069,948 B2 | | 7/2006 | Lovell |
| 7,121,299 B2 | | 10/2006 | Lumello |
| 7,185,672 B2 | | 3/2007 | Lovell |
| 7,201,336 B2 | | 4/2007 | Blette et al. |
| 7,207,497 B2 | | 4/2007 | Clark |
| 7,246,759 B2 | | 7/2007 | Turnbull |
| 7,250,023 B2 | | 7/2007 | Bai |
| 7,341,207 B2 | * | 3/2008 | Hubmann .................... 239/310 |
| 7,347,136 B2 | | 3/2008 | Bruggeman et al. |
| 7,350,723 B2 | * | 4/2008 | Reedy .......................... 239/332 |
| 7,360,720 B2 | | 4/2008 | Gohring et al. |
| 7,374,377 B2 | | 5/2008 | Bauman |
| 7,431,223 B2 | | 10/2008 | Gohring |
| 7,484,676 B2 | | 2/2009 | Joseph et al. |
| 7,540,434 B2 | | 6/2009 | Gohring et al. |
| 7,549,449 B2 | | 6/2009 | Herre et al. |
| 7,694,896 B2 | * | 4/2010 | Turnbull et al. ............. 239/379 |
| 2002/0166905 A1 | | 11/2002 | Huang |
| 2003/0201340 A1 | | 10/2003 | Hanson |
| 2004/0164182 A1 | | 8/2004 | Joseph et al. |
| 2005/0150521 A1 | | 7/2005 | Jones et al. |
| 2005/0269425 A1 | | 12/2005 | Gohring et al. |
| 2005/0279517 A1 | | 12/2005 | Hoffman et al. |
| 2006/0005766 A1 | | 1/2006 | Gorges et al. |
| 2006/0275555 A1 | | 12/2006 | Colizza et al. |
| 2007/0278787 A1 | | 12/2007 | Jones et al. |
| 2008/0029619 A1 | | 2/2008 | Gohring et al. |
| 2008/0217442 A1 | | 9/2008 | Anfindsen et al. |
| 2008/0226407 A1 | | 9/2008 | Bauman |
| 2008/0296409 A1 | | 12/2008 | Micheli |
| 2009/0145980 A1 | | 6/2009 | Jones |
| 2009/0230218 A1 | | 9/2009 | Drozd |
| 2009/0277976 A1 | | 11/2009 | Micheli et al. |
| 2009/0302133 A1 | | 12/2009 | Micheli et al. |
| 2010/0163654 A1 | | 7/2010 | Bass et al. |

FOREIGN PATENT DOCUMENTS

| | | | |
|---|---|---|---|
| CN | 1706557 | A | 12/2005 |
| CN | 101081383 | A | 12/2007 |
| CN | 101125317 | A | 2/2008 |
| DE | 8713954 | U1 | 12/1987 |
| DE | 202007003070 | U1 | 7/2008 |
| DE | 202008009203 | U1 | 9/2008 |
| EP | 0513626 | A1 | 11/1992 |
| GB | 290866 | A | 5/1928 |
| GB | 2063424 | A | 6/1981 |
| JP | 63-020965 | U | 2/1988 |
| JP | 5212323 | A | 8/1993 |
| JP | 10507249 | T | 7/1998 |
| JP | 10510209 | T | 10/1998 |
| JP | 2003088781 | A | 3/2003 |
| WO | 9617689 | A1 | 6/1996 |
| WO | 9809073 | A1 | 3/1998 |
| WO | 02072276 | A1 | 9/2002 |
| WO | 2004025123 | A1 | 3/2004 |
| WO | 2006087055 | A1 | 8/2006 |
| WO | 2010047800 | A2 | 4/2010 |

OTHER PUBLICATIONS

PCT International Search Report and Written Opinion for International Appln. No. PCT/US2010/057033 dated Mar. 17, 2011, 8 pages.

PCT International Search Report and Written Opinion for International Appln. No. PCT/US2010/057041 dated Mar. 17, 2011, 10 pages.

PCT International Search Report and Written Opinion for International Appln. No. PCT/US2010/057050 dated Mar. 14, 2011, 8 pages.

* cited by examiner

PAINT SPRAYER

CROSS-REFERENCE TO RELATED APPLICATIONS

This application claims the benefit of U.S. Provisional Application No. 61/261,953, filed on Nov. 17, 2009. The entire disclosure of the above application is incorporated herein by reference.

FIELD

The present disclosure relates to a sprayer for spraying fluids including paints and stains.

BACKGROUND

Paint sprayers are well-known in the art. For example, U.S. Pat. No. 7,360,720 discloses a spray gun for spraying paints, lacquers or similar media. This and other conventional spray guns can have a number of drawbacks. For example, conventional spray guns often lack an adequate indication to a user of the flow rate of the sprayer. Further, it is often difficult to refill the reservoir and adjust the spray pattern of conventional paint sprayers.

I would be desirable to provide a sprayer that includes an indication of the flow rate of the sprayer to the user and also simplifies the refilling of the sprayer and adjustment of the spray pattern.

SUMMARY

This section provides a general summary of the disclosure, and is not a comprehensive disclosure of its full scope or all of its features.

In some embodiments of the present disclosure, a sprayer for spraying a fluid can include a sprayer body, a fluid reservoir, a trigger assembly, a flow adjustment mechanism and a trigger plunger. The sprayer body can include a handle portion and a nozzle portion. The nozzle portion can include a nozzle assembly that defines a fluid outlet and includes a fluid conduit and a needle arranged within the fluid conduit. The needle can be movable to a plurality of positions between a closed position and a fully opened position. The needle can close the fluid outlet in the closed position and fully open the fluid outlet in the fully opened position. The fluid reservoir can be coupled to the sprayer body and be in communication with the fluid outlet and fluid conduit. The trigger assembly can be coupled to the nozzle assembly and be configured to move the needle as the trigger assembly is depressed. The flow adjustment mechanism can be coupled to the trigger assembly and be configured to adjust a flow rate of the sprayer by limiting movement of the trigger assembly and the needle. The trigger plunger can be coupled to the trigger assembly and include a flow rate indicator that provides an indication of the flow rate.

In other embodiments, a sprayer for spraying a fluid can include a sprayer body, a fluid reservoir, a trigger assembly, a flow adjustment mechanism and a flow rate indicator. The sprayer body can include a handle portion and a nozzle portion. The nozzle portion can include a nozzle assembly that defines a fluid outlet and that includes a fluid conduit and a needle arranged within the fluid conduit and extending in an axial direction. The needle can be movable to a plurality of positions between a closed position and a fully opened position, the needle closing the fluid outlet in the closed position and fully opening the fluid outlet in the fully opened position.

The fluid reservoir can be coupled to the sprayer body and be in communication with the fluid outlet and fluid conduit. The trigger assembly can be coupled to the nozzle assembly and be configured to move the needle as the trigger assembly is depressed. The flow adjustment mechanism can be coupled to the trigger assembly and be configured to adjust a flow rate of the sprayer by limiting movement of the trigger assembly and the needle. The flow adjustment mechanism can include a coupler coupled to a rotatable collar such that rotation of the collar moves the coupler in the axial direction. The flow rate indicator can be coupled to the coupler and provide an indication of the flow rate.

In various other embodiments, a sprayer for spraying can include a sprayer body, a fluid reservoir, a trigger assembly, a flow adjustment mechanism and a flow rate indicator. The sprayer body can include a handle portion and a nozzle portion. The nozzle portion can include a nozzle assembly that defines a fluid outlet and that includes a fluid conduit and a needle arranged within the fluid conduit. The needle can be movable to a plurality of positions between a closed position and a fully opened position, the needle closing the fluid outlet in the closed position and fully opening the fluid outlet in the fully opened position. The fluid reservoir can be coupled to the sprayer body and be in communication with the fluid outlet and fluid conduit. The trigger assembly can be coupled to the nozzle assembly and be configured to move the needle as the trigger assembly is depressed, The flow adjustment mechanism can be configured to adjust a flow rate of the sprayer by limiting movement of the trigger assembly and the needle. The flow rate indicator can be arranged within an aperture of the sprayer body such that a position of the flow rate indicator within the aperture corresponds to the flow rate of the sprayer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
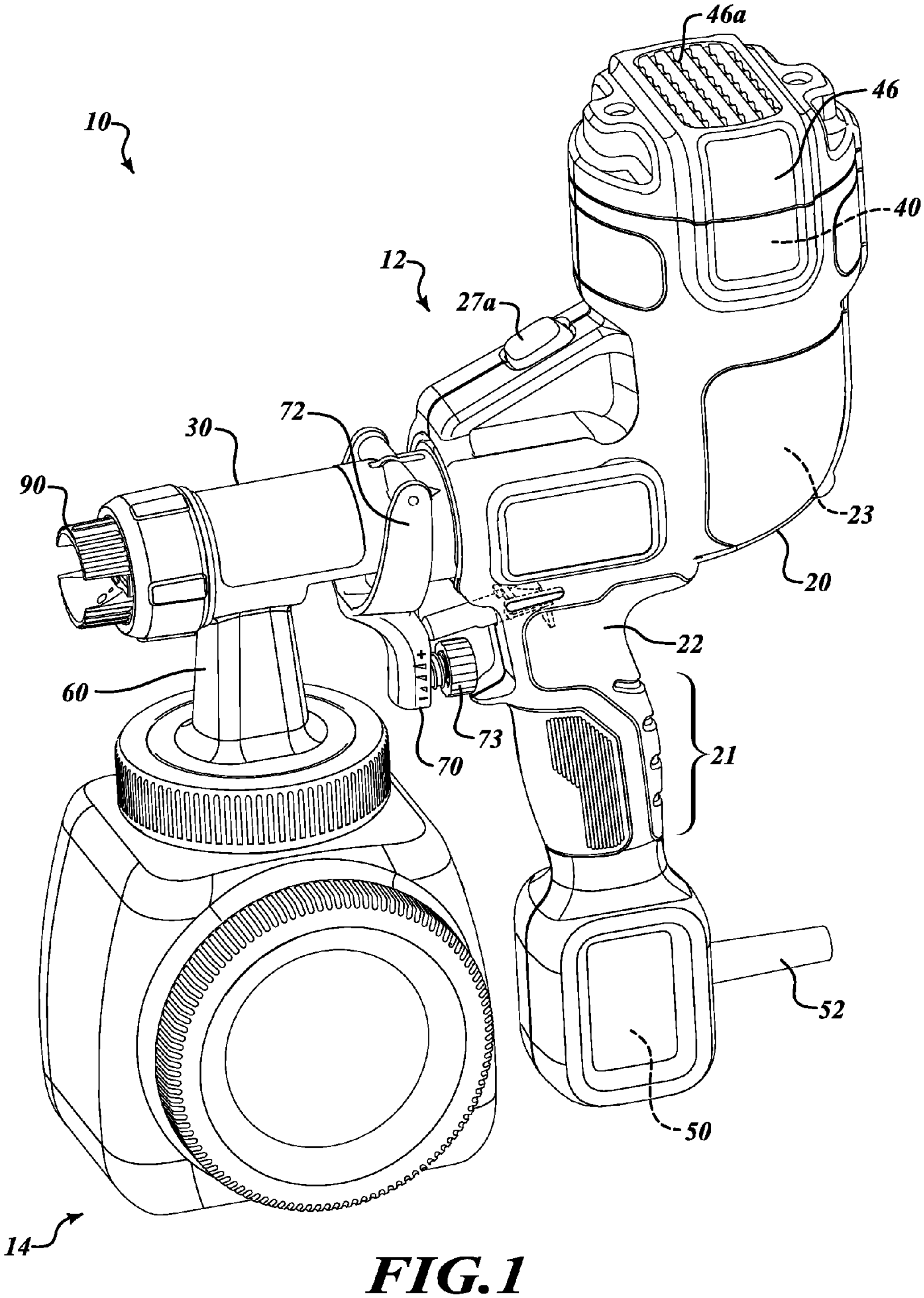
FIG. 1 is a perspective view of a first exemplary sprayer constructed in accordance with the teachings of the present disclosure.

With reference to FIG. 1 of the drawings, a first sprayer constructed in accordance with the teachings of the present disclosure is generally indicated by reference numeral 10. The sprayer 10 can include a sprayer body 12 and a reservoir 14 that can be removably coupled to the sprayer body 12. In the particular example illustrated in FIG. 1, the sprayer 10 is a handheld high volume low pressure (HVLP) sprayer for spraying fluids, e.g., paints and stains. One skilled in the art will appreciate that the teachings of the present disclosure can apply to other types of sprayers, such as but not limited to solenoid-type sprayers and floor based, HVLP sprayers.

Figure 2:
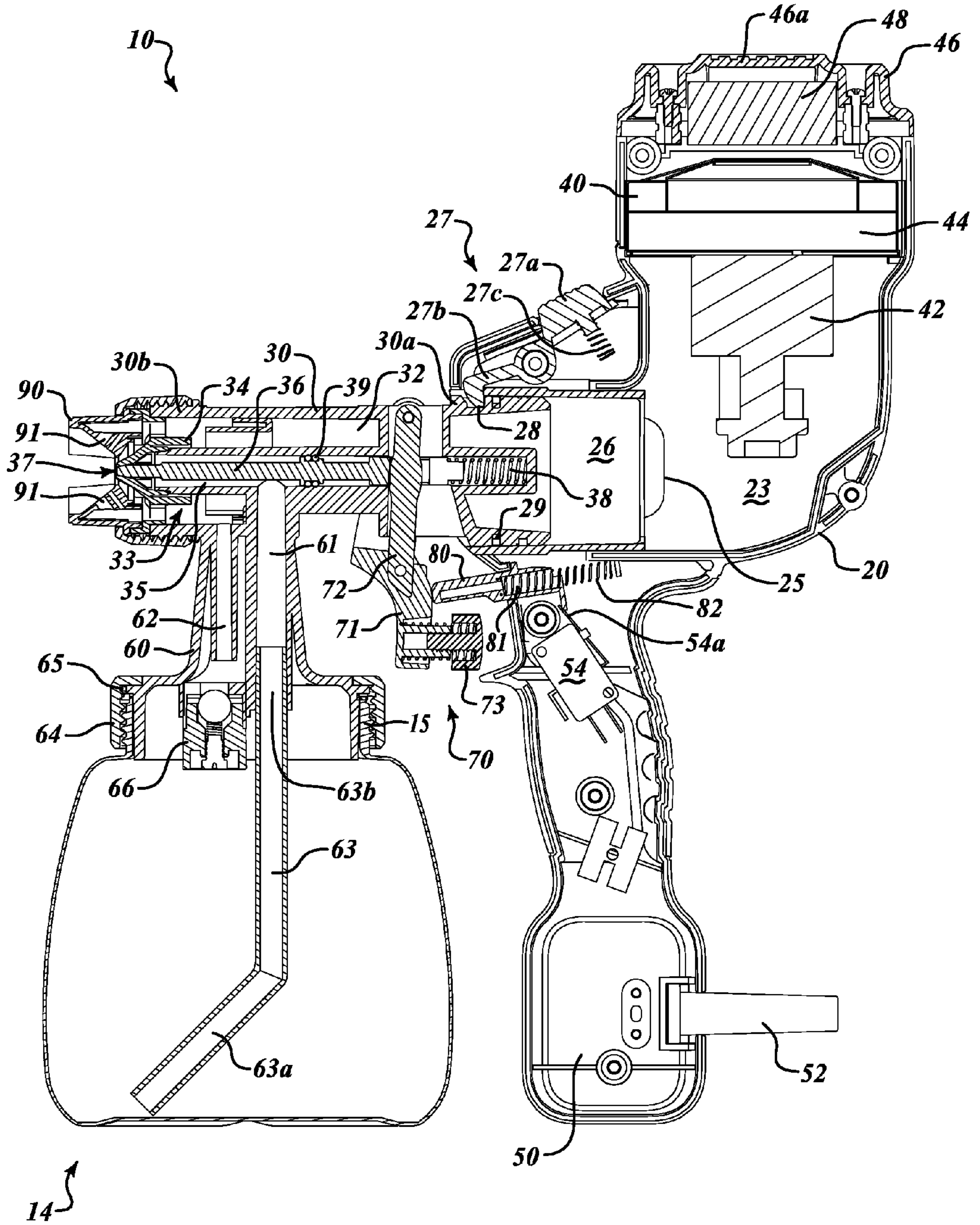
FIG. 2 is a section view of the sprayer of FIG. 1.

With reference to FIGS. 1 and 2, the sprayer body 12 can comprise a handle portion 20 and a nozzle portion 30. The handle portion 20 can include a graspable member 21 that is shaped to correspond to a user's hand. The graspable member 21 can include a cushion 22 made of rubber or similar material to enhance the comfort and gripability of the graspable member 21. A power supply 50 can be arranged within the handle portion 20. Power supply 50 can comprise a rechargeable battery pack, removable or otherwise, or similar source of portable power. Alternatively, power supply 50 can include an AC/DC converter or similar circuit to provide operating power to the electrical components of sprayer 10 (such as motor and fan assembly 40) from a source of AC power. For example, power cord 52 can be electrically connected and provide AC power to power supply 50. Power cord 52 can include a plug (not shown) that can be plugged into a standard household outlet or other source of AC power, as is well known in the art. A switch 54 can be electrically connected to the power supply 50 in order to selectively provide operating power to the sprayer 10.

The handle portion 20 can also define an air supply chamber 23. Air supply chamber 23 can provide pressurized air to the nozzle portion 30 in order to operate sprayer 10, as described more fully below. Air supply chamber 23 can be arranged between a housing cap 46 and a handle air outlet 25. As shown in the example illustrated in FIG. 2, a motor and fan assembly 40 can be arranged within the air supply chamber 23. Motor and fan assembly 40 can include an electric motor 42 coupled to and powering a fan 44. Fan 44 can generate an air flow from outside of sprayer 10, through aperture(s) 46*a* defined in housing cap 46 and into air supply chamber 23. An air filter 48 can be arranged within this air flow path to filter the air to remove any foreign objects that could damage sprayer 10. Motor and fan assembly 40 and handle air outlet 25 can be configured such that the air within air supply chamber (and exiting handle air outlet 25) is at a pressure that is relatively constant during operation of the sprayer 10.

Nozzle portion 30 can be sealingly engaged with the handle portion 20 such that pressurized air exiting the handle air outlet 25 can be received within a pressurized air passageway 32 defined by the nozzle portion 30. Pressurized air passageway 32 can be a cylindrical aperture extending from a first end 30*a* coupled to the handle portion 20 and a second end 30*b*. An air horn assembly 90 can be coupled to the second end 30*b* of pressurized air passageway 32. During operation of the sprayer 10, pressurized air can travel from air supply chamber 23, through handle air outlet 25 and into pressurized air passageway 32, and then exit pressurized air passageway 32 through one or more air horn apertures 91 defined by the air horn assembly 90. The configuration of the one or more air horn apertures 91 can determine the spray pattern of sprayer 10.

In some embodiments, nozzle portion 30 can be removably coupled to handle portion 20. For example, the first end 30*a* of nozzle portion 30 can be received within an aperture 26 defined by handle portion 20. Aperture 26 can be sized to complement first end 30*a* such that handle portion 20 and nozzle portion 30 are frictionally engaged. In some embodiments, handle portion 20 and nozzle portion 30 can be threadably coupled by including complementary threads on each of handle portion 20 and nozzle portion 30. Handle portion 20 and nozzle portion 30 can also be coupled with a quick-disconnect mechanism 27, as shown in FIG. 2. Quick-disconnect mechanism 27 can include a push-button 27*a* coupled to a catch 27*b* that engages with a groove 28 formed in the nozzle portion 30. A biasing member, such as spring 27*c*, can be included to bias the quick-disconnect mechanism 27 to the locked position. A user can depress push button 27*a* to move the catch 27*b* to an unlocked position, which allows the nozzle portion 30 to be removed from handle portion 20. One or more seals 29 can be included to seal the interface between handle portion 20 and nozzle portion 30 such that pressurized air does not escape through this interface.

A nozzle assembly 33 can be arranged within the nozzle portion 30 and include a nozzle 34, a fluid conduit 35 and a needle 36 arranged within the fluid conduit 35. The nozzle 34 can define a fluid outlet 37 in communication with the fluid conduit 35. The needle 36 can be movable to a plurality of positions between a closed position (shown in FIG. 2) in which the needle 36 closes the fluid outlet 37, and a fully opened position in which the needle 36 is retracted to fully open the fluid outlet 37. Based on the position of the needle 36, the size of the nozzle aperture 37*a* (see FIG. 17) defined between the needle 36 and fluid outlet 37 can be variable, thus varying the amount of fluid that exits fluid outlet 37. A biasing member, e.g., spring 38, can bias the needle 36 to the closed position. Pressurized fluid can be provided to the fluid conduit 35 such that fluid will exit the fluid conduit 35 through fluid outlet 37 when the needle 36 opens the fluid outlet 37. One or more seals 39 can be included to seal the needle 36/fluid conduit 35 interface such that fluid does not travel rearwardly out of the fluid conduit 35, i.e., in the direction opposite the fluid outlet 37. Seal(s) 39 can also assist in maintaining the needle 36 in the center of the fluid conduit 35.

The nozzle portion 30 can further include a reservoir coupler 60 that is configured to sealingly engage the reservoir 14. In some embodiments, the reservoir 14 can include a threaded neck 15 that threadably couples to reservoir coupler 60, for example, by a threaded collar 64. One or more seals 65 can be provided to seal the interface between reservoir coupler 60 and reservoir 14.

Reservoir coupler 60 can include an inlet conduit 61 and a pressurization conduit 62. A removable supply tube 63 can be received within the reservoir 14 and reservoir coupler 60. A first end 63*a* of the removable supply tube 63 can be arranged at the bottom of the reservoir 14 and a second end 63*b* can be arranged to sealingly mate with the inlet conduit 61. A fluid filter (not shown) can also be coupled to supply tube 63 to remove foreign objects from the fluid that could damage sprayer 10. The supply tube 63 and inlet conduit 61 can provide a communication path between fluid conduit 35 and the reservoir 14 such that fluid within reservoir 14 can be provided to fluid conduit 35. Pressurization conduit 62 can be arranged to provide pressurized air to reservoir 14 during operation of the sprayer 10 by communicatively coupling reservoir 14 with pressurized air passageway 32. A check valve 66 can be arranged within pressurization conduit 62 to allow pressurized air to enter reservoir 14 while inhibiting fluid within reservoir 14 to enter pressurized air passageway 32.

A trigger assembly 70 can be coupled to the nozzle assembly 33. A user can actuate trigger assembly 70 to begin operation of sprayer 10, as described more fully below. Trigger assembly 70 can include a trigger 71 that is coupled to a trigger collar 72. The trigger collar 72 can be coupled to the needle 36 such that, when the trigger assembly 70 is depressed, the needle 36 will move in an axial direction and open the fluid outlet 37.

A flow adjustment mechanism 73 can be coupled to the trigger assembly 70 to adjust the flow rate of fluid that exits the sprayer 10 during operation. Flow adjustment mechanism 73 can limit movement of the trigger assembly 70 and needle 36 and thereby control the size of the nozzle aperture 37*a* and flow rate of the sprayer 10. For example, flow adjustment mechanism 73 can act as a mechanical stop for the trigger assembly 70 by contacting the handle portion 20 when the trigger assembly 70 is depressed. As shown in FIG. 2, flow adjustment mechanism 73 can include a rotatable knob that threadably couples to the trigger assembly 70. A user can adjust the flow rate of the sprayer 10 by rotating the rotatable knob, thereby extending or retracting the flow adjustment mechanism 73. Flow adjustment mechanism 73 can further include a biasing spring that interacts with the knob and assists in maintaining the position of the flow adjustment mechanism 73.

A trigger plunger 80 can be coupled to handle portion 20. Trigger plunger 80 can be coupled with switch 54 and be configured to actuate switch 54 when the trigger assembly 70 is depressed. Trigger plunger 80 can be received within an aperture 81 formed in handle portion 20. A spring 82 or other biasing member can be used to bias the trigger plunger 80 to an extended state whereby switch 54 is turned OFF. Upon depression of the trigger assembly, trigger plunger 80 can contact trigger assembly 70 and be moved to a compressed state whereby switch 54 is turned ON. For example only, switch 54 can be a mechanical switch that includes a lever arm 54*a* that interacts with trigger plunger 80 (such as switch arm 80*d* described below).

Figure 9:
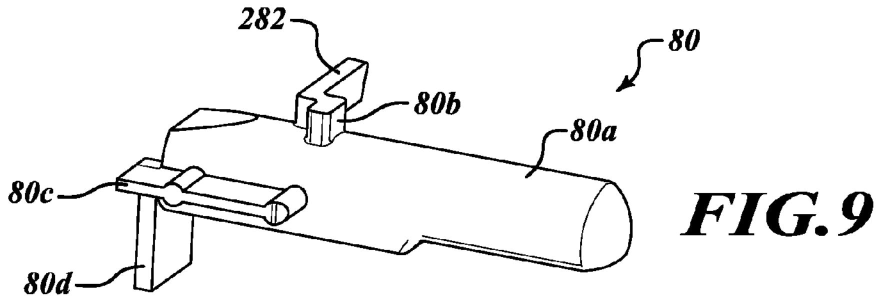
FIG. 9 is a perspective view of an exemplary trigger plunger constructed in accordance with the teachings of the present disclosure.
Figure 10:
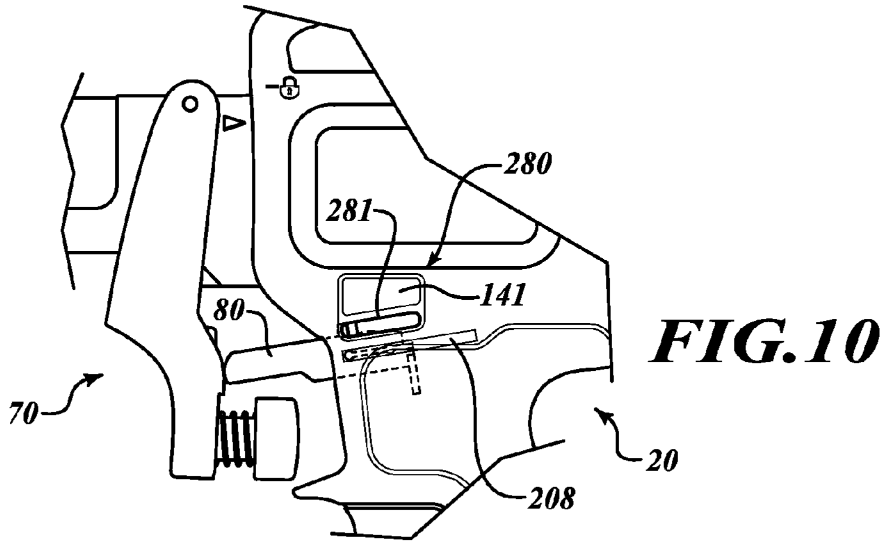
FIG. 10 is a perspective view of a portion of the sprayer of FIG. 1 illustrating an exemplary flow rate adjustment mechanism constructed in accordance with the teachings of the present disclosure in a first condition.
Figure 11:
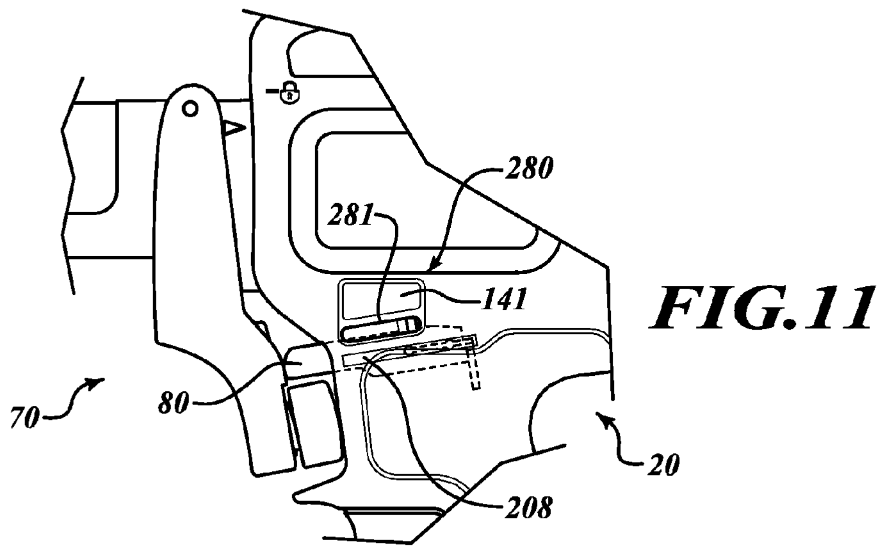
FIG. 11 is a perspective view of a portion of the sprayer of FIG. 1 illustrating the exemplary flow rate adjustment mechanism of FIG. 10 in a second condition.

In various embodiments, sprayer 10 can include a flow rate indicator 280 to provide an indication to the user of the flow rate of sprayer 10. Referring now to FIGS. 9-11, flow rate indicator 280 can include an aperture 281 formed in handle portion 20 and a flow rate projection 282 extending from the main body 80*a* of trigger plunger 80. Trigger plunger 80 can further include a stop projection 80*b*, a guide wing 80*c* and a switch arm 80*d*. Stop projection 80*b* can act as a mechanical stop to counter the force of spring 82 and maintain trigger plunger 80 within handle aperture 81. Guide wing 80*c* can be received within a guide slot 208 formed in handle portion 20. Guide wing 80*c* and guide slot 208 cooperate to guide movement of the trigger plunger 80. Switch arm 80*d* can cooperate with lever arm 54*a* to actuate switch 54. Flow rate projection 282 can be visible through and/or arranged within aperture 281. These markings can be affixed to or formed on handle portion 20 proximate aperture 281. Markings in cooperation with flow rate projection 282 can be utilized to provide an indication to the user of the flow rate of sprayer 10. For example only, the position of flow rate projection 282 in FIG. 10 can indicate no fluid flow, while the position of flow rate projection 282 in FIG. 11 can indicate maximum fluid flow. While flow rate projection 282 moves only in response to trigger assembly 70 being depressed, one skilled in the art can appreciate that flow rate indicator 280 can be constructed to indicate the flow rate with trigger assembly 70 in an undepressed condition.

Sprayer 10 can operate as follows. Reservoir 14 can be filled by first uncoupling the reservoir 14 from the nozzle portion 30 and then pouring a desired fluid through the neck 15 into the reservoir 14. The reservoir 14 can then be sealingly coupled with the nozzle portion 30, e.g., with reservoir coupler 60, such that the first end 63*a* of supply tube 63 is immersed in the fluid. Power cord 52 can be plugged into a standard household outlet or other source of AC power to provide operating power to the sprayer 10.

A user can them turn ON the sprayer 10, e.g., by depressing trigger assembly 70, which then compresses trigger plunger 80 and actuates switch 54. Actuation of switch 54 can turn ON motor and fan assembly 40 to provide pressurized air to air supply chamber 23. Pressurized air can exit air supply chamber 23 through handle air outlet 25, travel through pressurized air passageway 32 and exit sprayer 10 through the one or more air horn apertures 91. Pressurized air can also be provided to reservoir 14 through pressurization conduit 62 to pressurize the reservoir 14, which can assist with drawing fluid through supply tube 63 into fluid conduit 35 and out of nozzle 33 during operation. For example only, the pressure inside of reservoir 14 during operation of sprayer 10 can be between 1.5 and 5 pounds per square inch ("psi") or, more specifically, between 2 and 3 psi.

As the trigger assembly 70 is depressed, trigger collar 72 axially moves needle 36 to open fluid outlet 37. In the illustrated example, flow adjustment mechanism 73 acts as a mechanical stop for the trigger assembly 70 and thus limits travel of the needle 36. As described above, the size of the nozzle aperture 37*a* and the flow rate of the sprayer 10 can vary based on the position of the needle 36 when the trigger assembly 70 is depressed. Fluid will exit the fluid outlet 37 of nozzle 33 and enter the pressurized air stream that is flowing out of air horn aperture(s) 91 to form a fluid spray.

Figure 3:
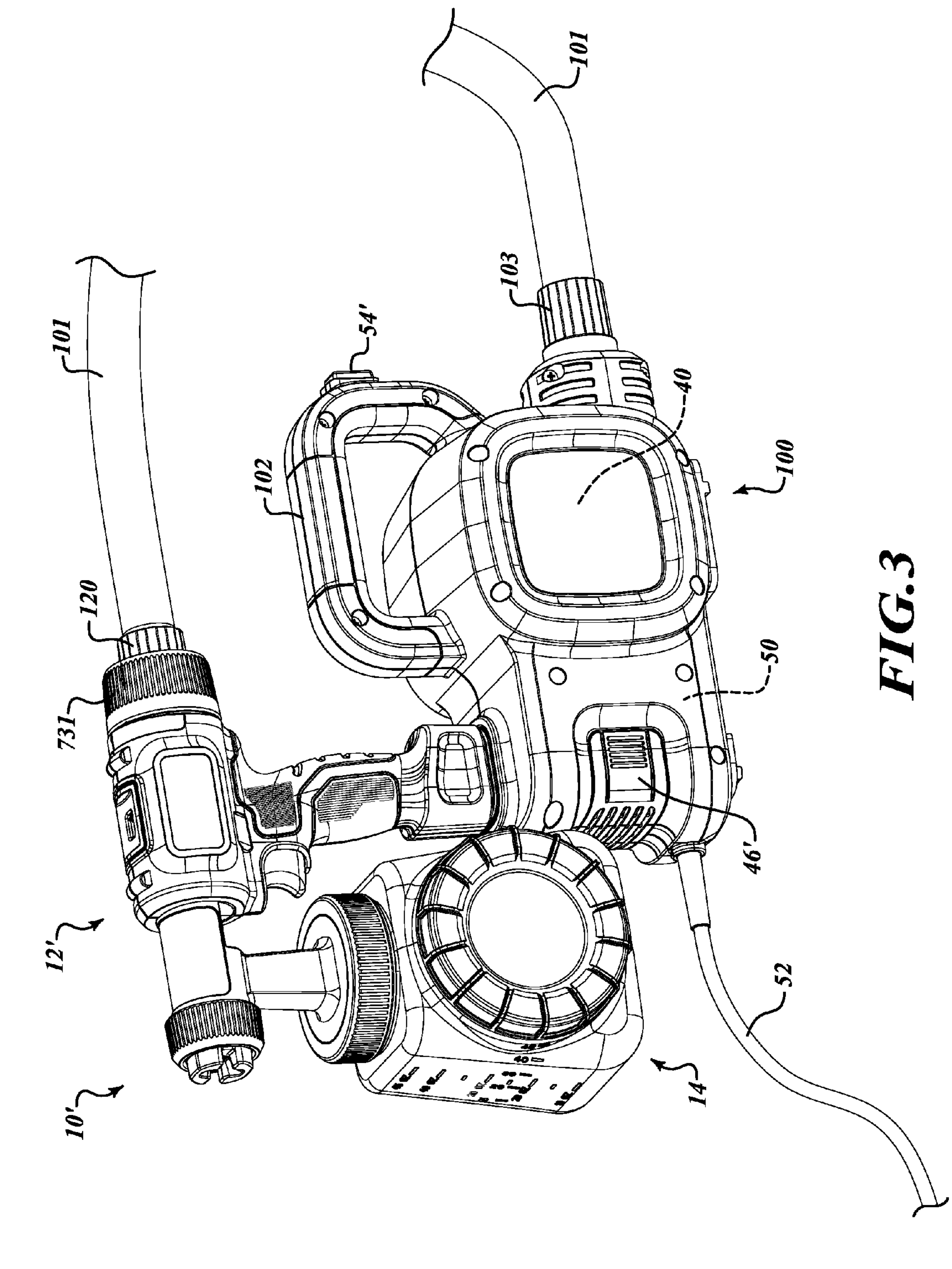
FIG. 3 is a perspective view of a second exemplary sprayer constructed in accordance with the teachings of the present disclosure.

With reference to FIG. 3, a second sprayer constructed in accordance with the teachings of the present disclosure is generally indicated by reference numeral 10'. The sprayer 10' can operate and be constructed identically to sprayer 10, except as described below. Sprayer 10' can include a sprayer body 12' and a reservoir 14 that can be removably coupled to the sprayer body 12'. In the particular example illustrated in FIG. 3, the sprayer 10' is a floor based, high volume low pressure (HVLP) sprayer for spraying fluids, e.g., paints and stains.

Figure 4:
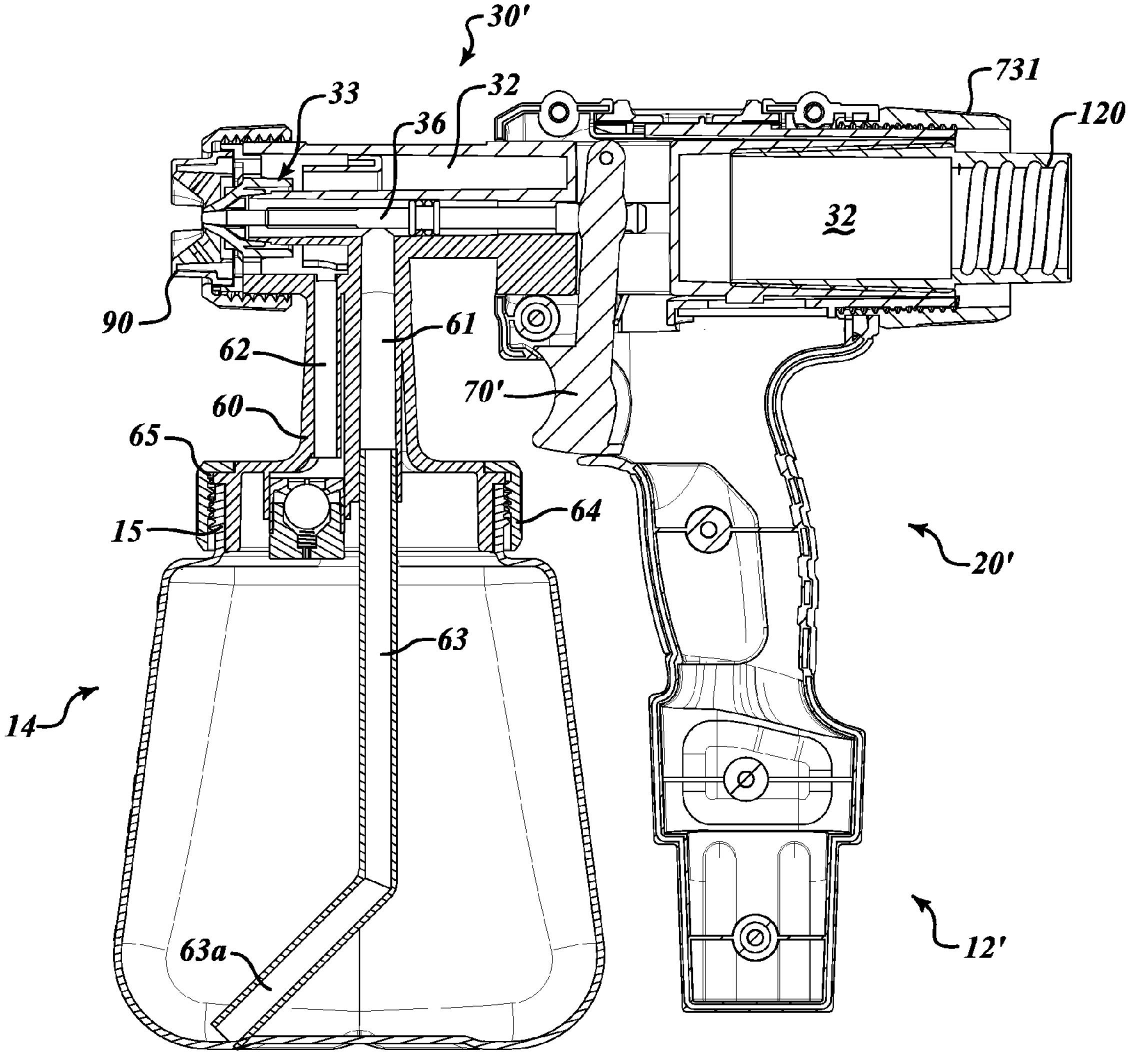
FIG. 4 is a section view of the sprayer of FIG. 3.

Referring now to FIGS. 3 and 4, sprayer body 12' can be coupled to a floor unit 100 by hose 101. In order to reduce the weight and complexity of sprayer body 12', floor unit 100 can include the motor and fan assembly 40 and power supply 50 that is located within handle portion 20 of sprayer 10. A switch 54' can be included on floor unit, e.g., on a handle 102 that can be utilized to move floor unit 100, to selectively power the sprayer 10'. During operation, air can enter the floor unit 100 through apertures in cap 46' and travel through hose 101 to sprayer body 12'. The hose 101 can be coupled to floor unit 100 by coupler 103, which can be a threaded coupler, quick-release coupler or other coupling device.

Sprayer body 12' can include a handle portion 20' coupled to a nozzle portion 30'. Hose 101 can be coupled to the sprayer body 12', e.g., by coupler 120. Similar to coupler 103, coupler 120 can be a threaded coupler, quick-release coupler or other coupling device. Hose 101 can provide pressurized air from floor unit 100 to pressurized air passageway 32 and out through air horn assembly 90, as described above. Further, pressurized air can travel from pressurized air passageway 32 through pressurization conduit 62 and into reservoir 14.

Figure 5:
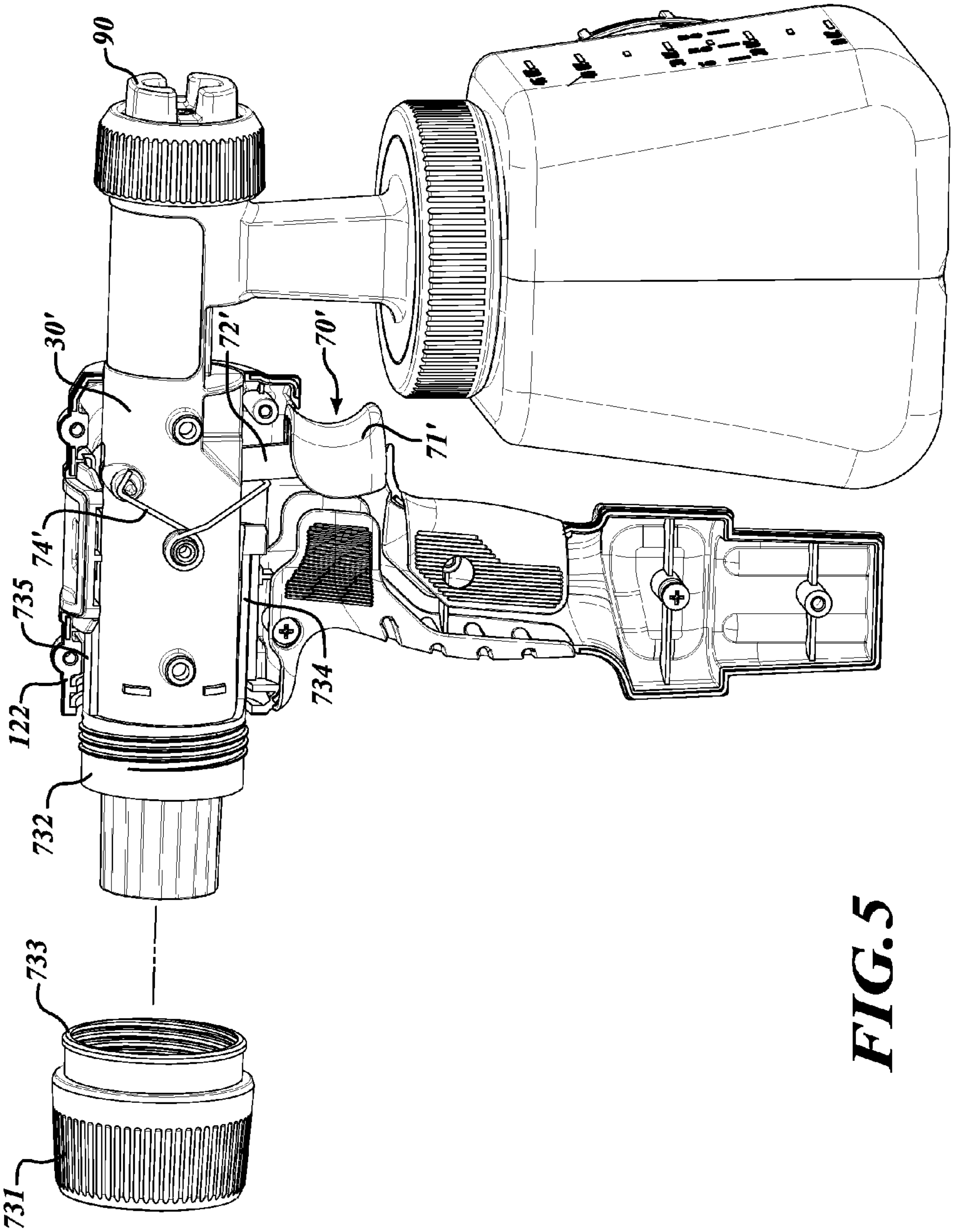
FIG. 5 is a partially exploded perspective view of a portion of the sprayer of FIG. 3.
Figure 6:
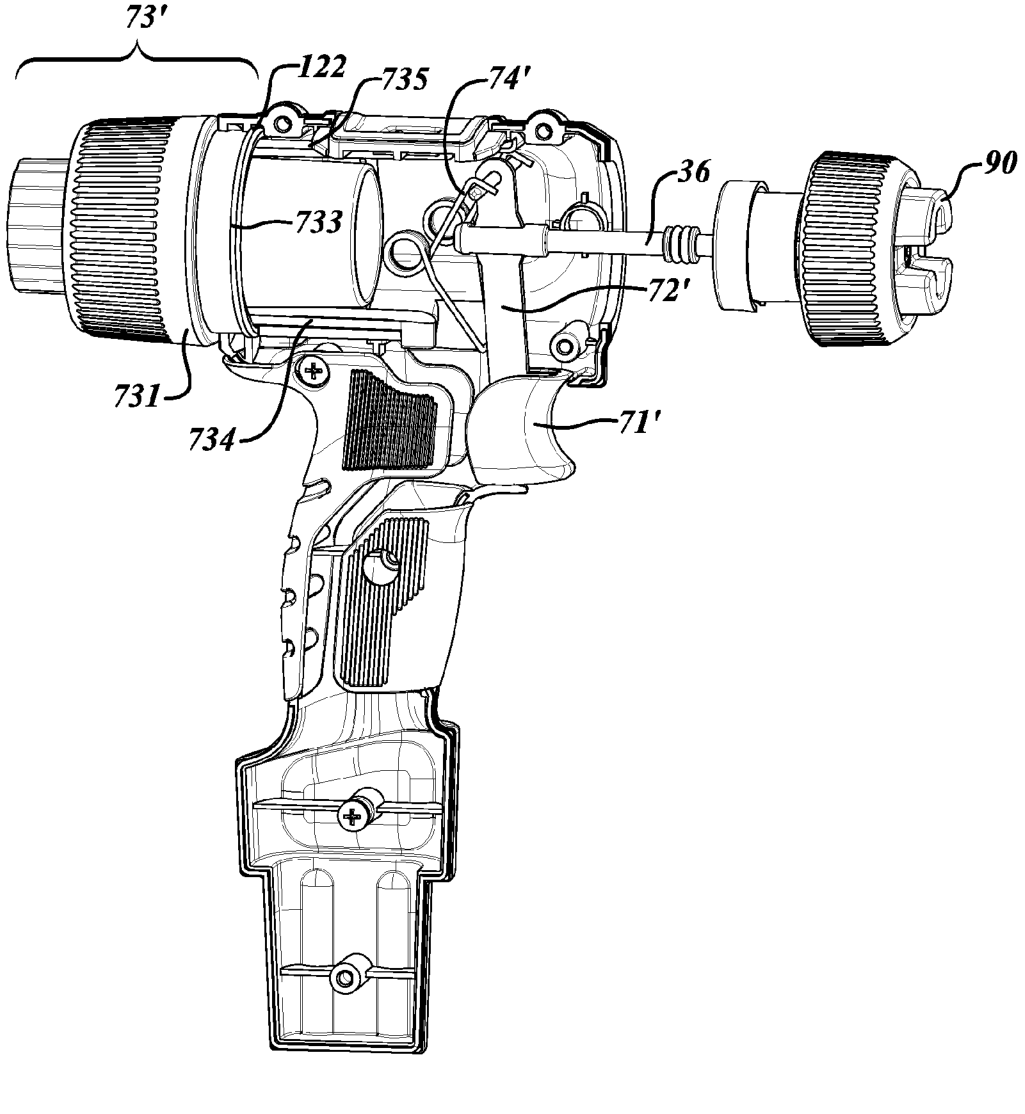
FIG. 6 is a perspective view of a portion of the sprayer of FIG. 3.
Figure 7:
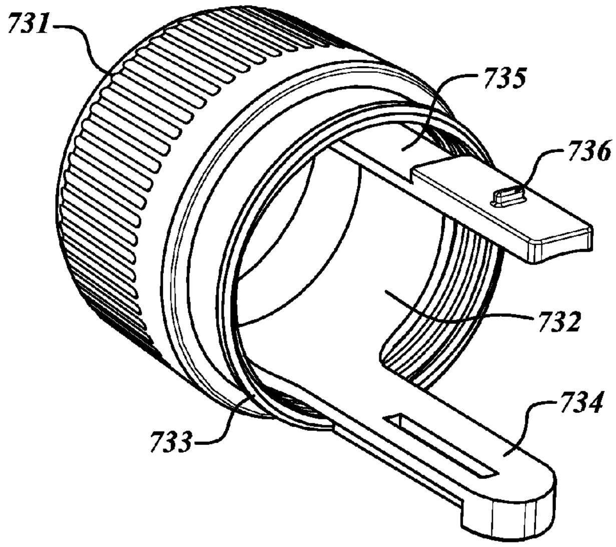
FIG. 7 is a perspective view of a flow adjustment mechanism of the sprayer of FIG. 3.

With particular reference to FIGS. 5 and 6, trigger assembly 70' can be coupled to the nozzle assembly 33. A user can actuate trigger assembly 70' to begin operation of sprayer 10'. Trigger assembly 70' can include a trigger 71' that is coupled to a trigger lever 72'. The trigger lever 72' can be coupled to the needle 36 such that, when the trigger assembly 70' is depressed, the needle 36 will move in an axial direction and open the fluid outlet 37. Trigger assembly 70' can further include a biasing member, such as torsion spring 74', that biases the trigger assembly 70' to be in the non-depressed condition and the needle 26 to be in the closed position.

A flow adjustment mechanism 73' can be coupled to the trigger assembly 70' to adjust the flow rate of fluid that exits the sprayer 10' during operation. Flow adjustment mechanism 73' can limit movement of the trigger assembly 70' and needle 36 and thereby control the size of the nozzle aperture 37*a* and flow rate of the sprayer 10'. For example, flow adjustment mechanism 73' can act as a mechanical stop for the trigger assembly 70' by contacting the trigger lever 72' when the trigger assembly 70' is depressed.

Flow adjustment mechanism 73' can include a rotatable collar 731 that interacts with a coupler 732. For example, coupler 732 can be threadably coupled to rotatable collar 731 as shown in the Figures. Collar 731 can include a ridge 733 that interacts with sprayer body 12', such as groove 122, to maintain the collar 731 and sprayer body 12' in a specific arrangement and inhibit movement of the collar 731 in the axial direction. Coupler 732 can include a first leg 734 that extends axially from the main body of the coupler 732. First leg 734 can be configured to contact the trigger assembly 70' (such as trigger lever 72') when the trigger assembly 70' is depressed and therefore act as a mechanical stop. Coupler 732 can be slidingly coupled to nozzle portion 30' such that, as the collar 731 is rotated, coupler 732 can travel axially, i.e., in the direction of the longitudinal axis of needle 36. In this manner, the position of coupler 732 and first leg 734 can be adjusted to limit movement of the trigger assembly 70' and needle 36, thus controlling the flow rate of sprayer 10'.

Figure 8:
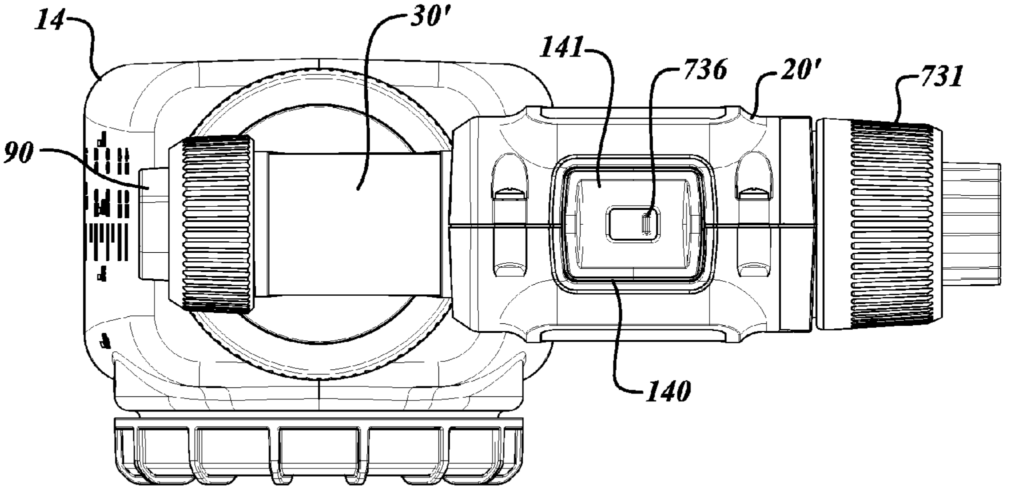
FIG. 8 is a top elevation view of the sprayer of FIG. 3 illustrating a portion of the flow adjustment mechanism.

Coupler 732 can further include a second leg 735 that includes a flow indicator 736. Second leg 735 can travel axially with the coupler 732 as the collar is rotated. Referring now to FIG. 8, flow indicator 736 may be visible through an aperture or window 140 formed in the handle portion 20' of sprayer 10'. Markings, such as label 141, can be affixed to or formed on handle portion 20'. Flow indicator 736, in cooperation with markings/label 141, can be utilized to provide an indication to the user of the flow rate of sprayer 10'.

Figure 12:
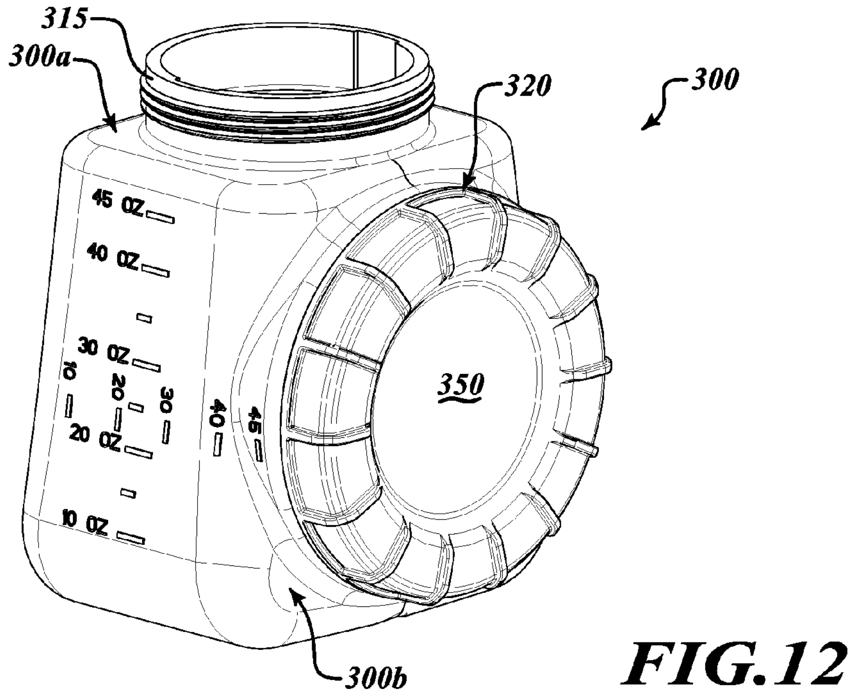
FIG. 12 is a perspective view of an exemplary reservoir constructed in accordance with the teachings of the present disclosure.
Figure 13:
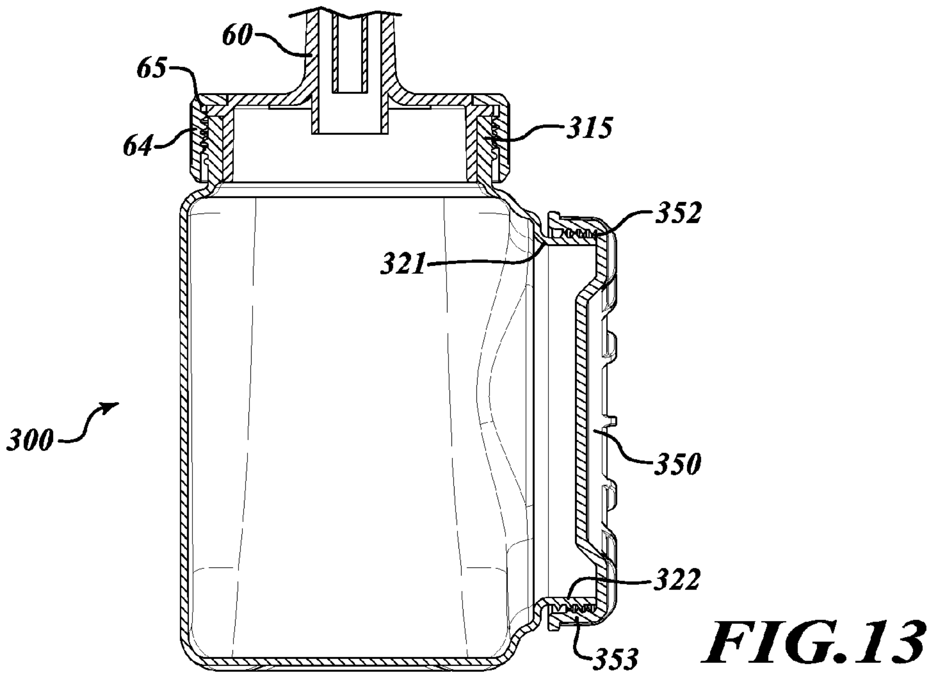
FIG. 13 is a section view of the reservoir of FIG. 12.

With reference to FIGS. 12 and 13 of the drawings, an exemplary reservoir constructed in accordance with the teachings of the present disclosure is generally indicated by reference numeral 300. Reservoir 300 can be utilized, for example, with both sprayer 10 and 10'. Reservoir 300 can include a first threaded neck 315 that threadably couples to reservoir coupler 60, for example, by threaded collar 64. One or more seals 65 can be provided to seal the interface between reservoir coupler 60 and reservoir 300.

Reservoir 300 can be filled by first uncoupling the reservoir 300 from the sprayer body 12, 12' and then pouring a desired liquid through the first threaded neck 315 into the reservoir 300. As will also be appreciated from this disclosure, fluid on reservoir coupler 60, supply tube 63, etc. can drip or spill onto the floor or another object when the reservoir 300 is separated from the reservoir coupler 60 during the filling of the reservoir 300. Such drips and spills can be avoided through use of a second neck 320 on the reservoir 300.

With reference to FIG. 13, the second neck 320 can comprise an annular neck member 321 and a plurality of threads 322 that can be disposed about the annular neck member 321. A cap 350 can be employed to sealingly close the second neck 320 and can comprise a cap body and a seal system 352. The cap 350 can comprise a plurality of threads 353 that can be threadably engaged to the threads 322 of the second neck 320. The seal system 352 can comprise one or more seals that can be employed to sealingly engage the second neck 320 and/or the cap 350 to inhibit the egress of fluids from the reservoir 300.

Second neck 320 can be configured such that cap 350 can be decoupled from reservoir 300 (second neck 320) while the reservoir 300 is coupled to the sprayer body 12, 12'. For example, first threaded neck 315 can be arranged on a first side 300*a* of reservoir 300 and second neck 320 can be arranged on a second side 300*b*. As illustrated in FIG. 12, first side 300*a* can be substantially perpendicular to second side 300*b*. With this arrangement, it will be appreciated that sprayer 10, 10' need only be tipped on its side and the cap 350 removed to permit access to the interior of the reservoir 300 to fill or empty the reservoir as desired.

The reservoir 300 can be manufactured in various ways, including blow molding or a combination of injection molding and blow molding.

It will be appreciated that the reservoir 300 can be constructed somewhat differently from that which is depicted in FIGS. 12 and 13. For example, the second neck 320 may extend from the body of the reservoir 300 in a direction that is upward and outward so that the reservoir 300 may be filled without tipping the sprayer 10, 10'. Further, the cap 350 can include a threaded body and a lid member that are hingedly coupled. In such a configuration, the reservoir 300 can be filled by rotating the lid member to disengage from the threaded body without decoupling the reservoir 300 from the threaded body. Additionally, the second neck 320 can be formed on a side of the reservoir 300 opposite neck 315 such that the sprayer 10, 10' can be turned upside down to fill the reservoir 300, i.e., first side 300*a* can be opposite second side 300*b*.

Figure 14:
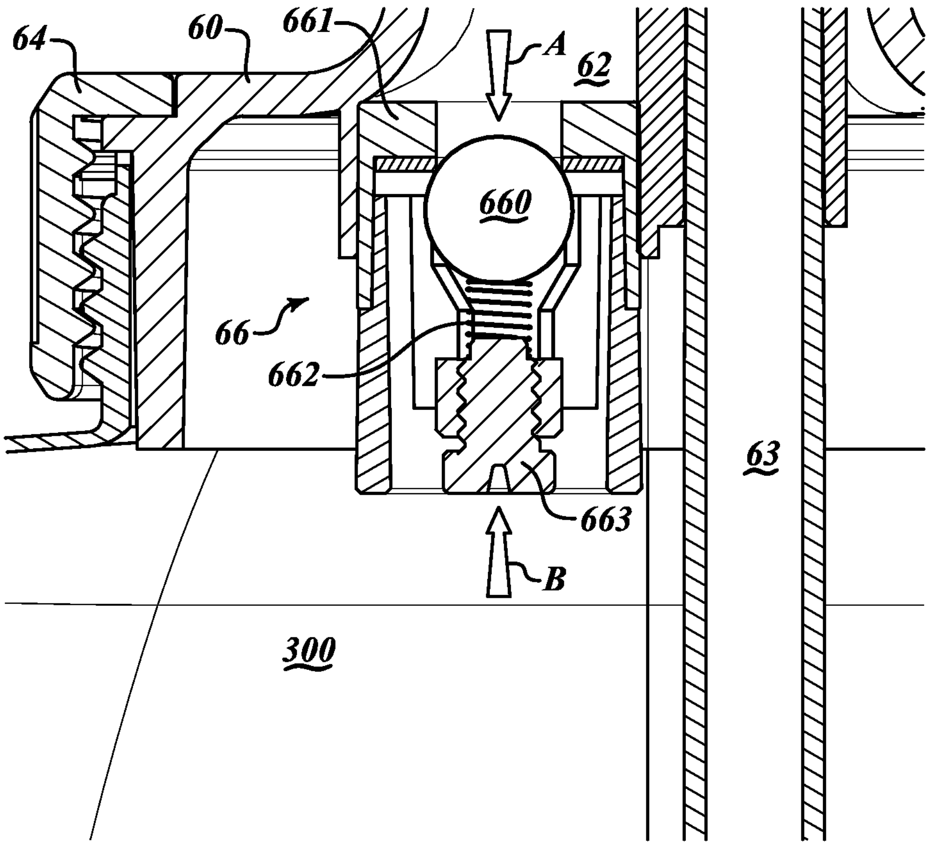
FIG. 14 is a section view of a portion of the sprayer of FIGS. 1 and 3 with the reservoir of FIG. 12 attached thereto illustrating an exemplary check valve assembly constructed in accordance with the teachings of the present disclosure.

When filling the reservoir 300 through second neck 320 by turning the sprayer 10, 10' upside down or on its side, it is possible that fluid could enter pressurization conduit 62 and/or pressurized air passageway 32. As described above, a check valve 66 can be arranged within pressurization conduit 62 to inhibit such fluid flow. Check valve 66 can comprise a ball check valve, as is illustrated in FIGS. 2, 4 and 14. Check valve 66 can include a spherical ball 660 arranged in a valve seat body 661. A biasing member, such as compression spring 662, can bias the check valve 66 to the closed position (shown in FIG. 14) in which spherical ball 660 contacts a valve seat defined by valve seat body 661. When pressurized air travels through pressurization conduit 62 in the direction indicated by arrow A, the spherical ball 660 is displaced from the valve seat, which allows pressurized air to enter reservoir 14 or 300. When fluid flows in the direction indicated by arrow B, the spring 662 and fluid act upon spherical ball 660 to contact and seal against the valve seat of valve seat body 661. An adjustment mechanism, such as threaded screw 663, can be included to adjust the force exerted on spherical ball 660 by compression spring 662 to ensure an adequate seal is maintained while also allowing pressurized air flow to travel into the reservoir 14 or 300.

Figure 15:
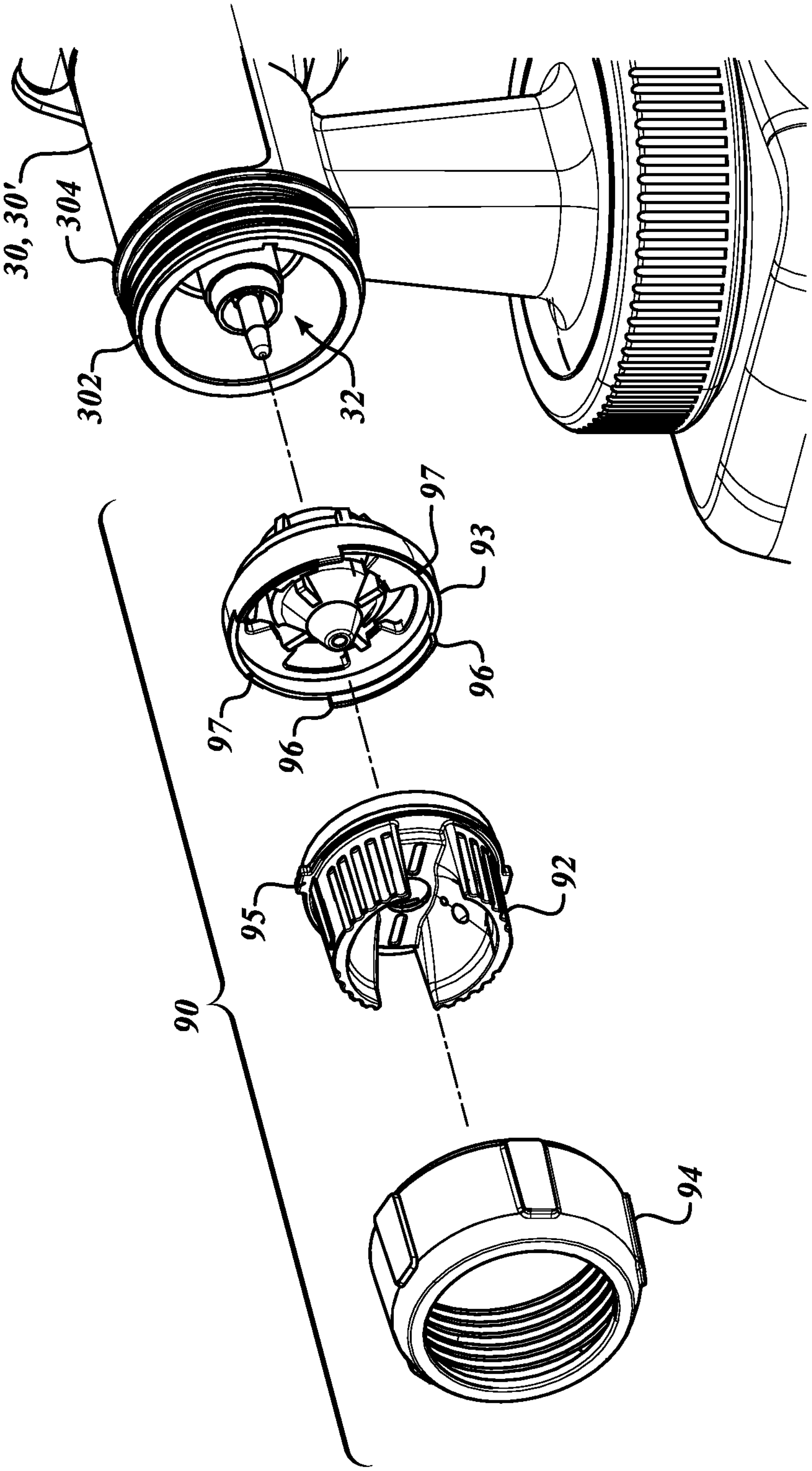
FIG. 15 is a partially exploded perspective view of a portion of the sprayer of FIG. 1 illustrating an exemplary air horn assembly constructed in accordance with the teachings of the present disclosure.
Figure 16A:
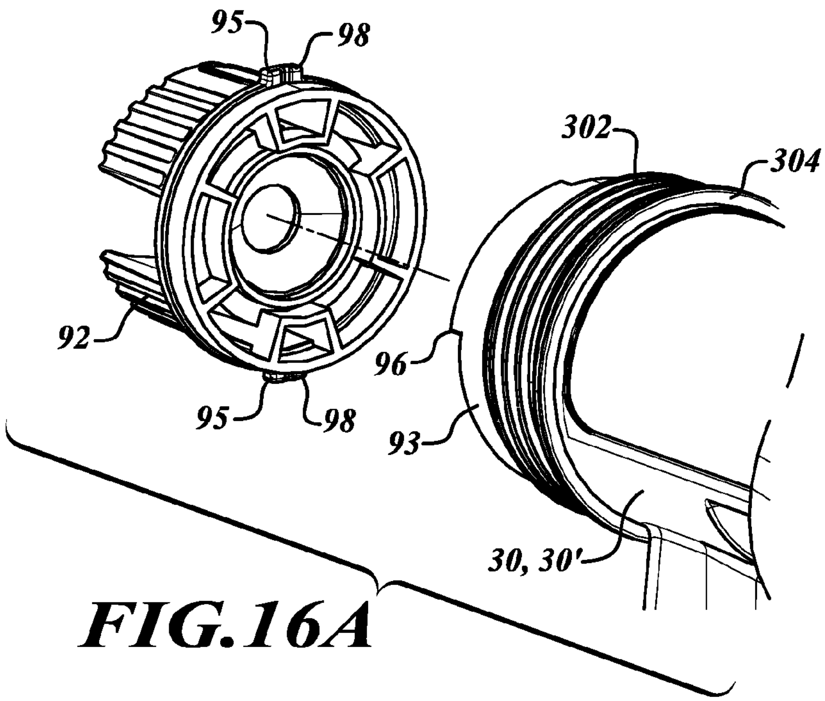
FIGS. 16A and 16B are perspective views of a portion of the sprayer of FIG. 1 illustrating a portion of the exemplary air horn assembly of FIG. 15.
Figure 16B:
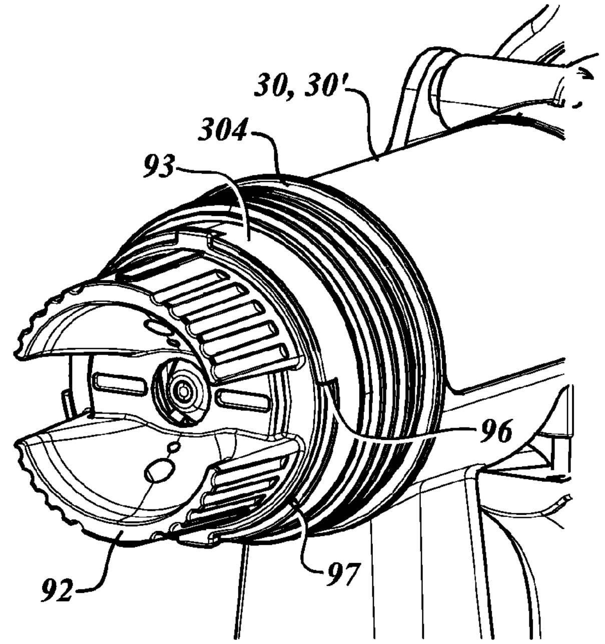
Figure 17:
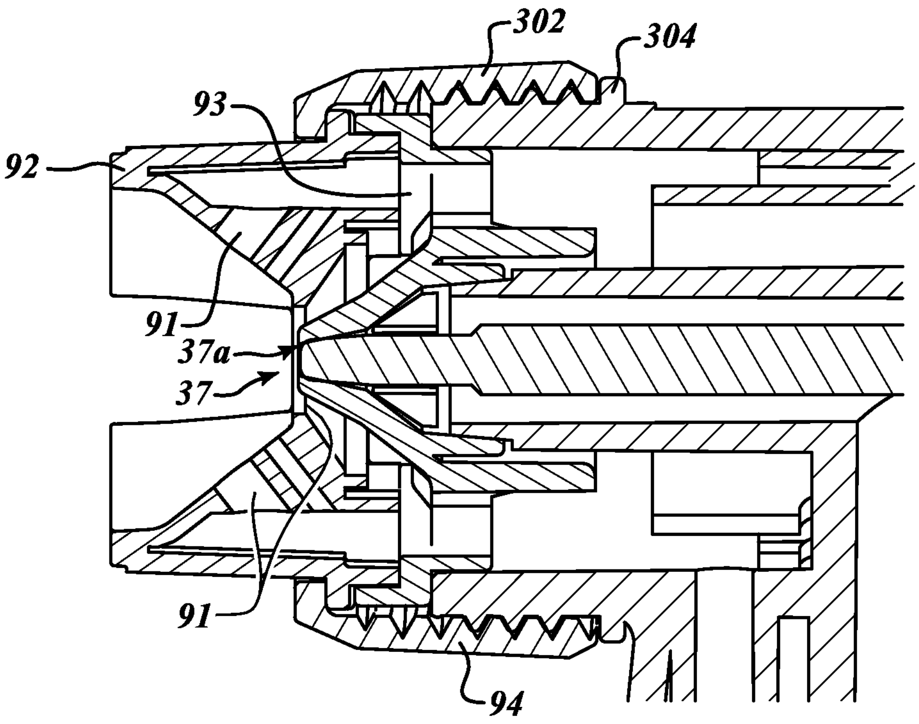
FIG. 17 is a section view of a portion of the sprayer of FIG. 1 illustrating a portion of the exemplary air horn assembly of FIG. 15.

Referring now to FIGS. 15 to 17, an exemplary air horn assembly 90 can include an air horn 92, an air diffuser 93 and a collar 94. As described above, air horn assembly 90 can be coupled to the second end 30*b* of nozzle portion 30 or 30'. Air diffuser 93 can be partially inserted into pressurized air passageway 32 and be configured to diffuse the pressurized air exiting therefrom. Air horn 92 can be coupled to air diffuser 93. Collar 94 can be coupled to second end 30*b*, e.g., by threadably coupling to a threaded portion 302, to retain air horn 92 and air diffuser 93 between collar 94 and second end 30*b*.

Air horn 92 can include one or more air horn projections 95. Air horn projections 95 can be configured to interact with corresponding stop surfaces 96 formed on air diffuser 93. Stop surfaces 96 can act as a mechanical stop to limit rotation of air horn 92. The position of the stop surfaces 96 and air horn projections 95 can correspond to specific positions of air horn assembly 90, such as a vertical spray pattern position or a horizontal spray pattern position. Additionally or alternatively, air horn projections 95 can include one or more protrusions 98 that interact with a corresponding number of notches 97 formed in air diffuser 93. The position of the protrusions 98 and notches 97 can act as a detent mechanism to correspond to specific positions of air horn assembly 90, such as an angled spray pattern position (such as, at an angle of 45 degrees). One skilled in the art will appreciate that the mechanical stop and/or detent mechanism can be constructed differently from that described above. For example, a notch can be formed in the air horn 92 that interacts with a protrusion on the air diffuser. Furthermore, instead of stop surfaces 96, air horn 92 and air diffuser 93 can include a plurality of detent mechanisms (such as notches 97 and protrusions 98) that correspond to specific positions of air horn assembly 90.

The construction of air horn assembly 90 and nozzle portion 30, 30' can allow for a simple adjustment of the position of the air horn assembly 90. For example, nozzle portion 30, 30' can include ridge member 304 that acts as a mechanical stop for collar 94. A user can arrange the air horn 92 and air diffuser 93 in the desired position and rotate collar 94 until it contacts ridge member 304. Ridge member 304 can be positioned such that the frictional force exerted on air horn 92 when the collar 94 is in contact with ridge member 304 is an amount that inhibits undesired rotation of air horn 92 (such as that caused by vibration during operation of sprayer 10, 10') while allowing a user to rotate the air horn 92 if desired. In this manner, the ridge member 304 and collar 94 can be configured to permit rotation of the air horn 92 without loosening the collar 94 from a fully tightened position (shown in FIG. 17) in which the collar 92 is contact with the ridge member 304. Stop surfaces 96, as well as notches 97 and protrusions 98, can assist in the proper positioning of air horn assembly 90.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A sprayer for spraying a fluid comprising:

a sprayer body including a handle portion and a nozzle portion, the nozzle portion including a nozzle assembly that defines a fluid outlet, the nozzle assembly including a fluid conduit and a needle arranged within the fluid conduit, the needle being movable to a plurality of positions between a closed position and a fully opened position, the needle closing the fluid outlet in the closed position and fully opening the fluid outlet in the fully opened position;

a fluid reservoir coupled to the sprayer body and in communication with the fluid outlet and fluid conduit;

a trigger assembly having a movable portion with a trigger, the movable portion being movably coupled to the sprayer body, wherein movement of the movable portion relative to the sprayer body is configured to move the needle;

a flow adjustment mechanism coupled to the trigger assembly and configured to adjust a maximum flow rate of the sprayer by limiting movement of the movable portion of the trigger assembly to thereby limit movement of the needle toward the fully opened position; and a trigger plunger contacting a member of the movable portion of the trigger assembly, the trigger plunger being movable with the member of the movable portion relative to the sprayer body, the trigger plunger including a flow rate indicator that is movable relative to the sprayer body to provide an indication of an actual flow rate of the sprayer.

2. The sprayer of claim 1, wherein the member of the movable portion of the trigger assembly is the trigger.

3. The sprayer of claim 1, wherein the flow adjustment mechanism comprises a rotatable knob that acts as a mechanical stop for the movable portion of the trigger assembly, wherein rotation of the rotatable knob adjusts a maximum amount that the trigger can be moved to thereby limit the maximum flow rate.

4. The sprayer of claim 3, wherein contact between the rotatable knob and the handle portion limits movement of movable portion of the trigger assembly in a manner that moves the needle toward the fully open position.

5. The sprayer of claim 4, wherein the handle portion defines first and second apertures, the trigger plunger being movably received in the first aperture and the flow rate indicator being visible from an exterior surface of the sprayer body through the second aperture.

6. The sprayer of claim 5, wherein a position of the flow rate indicator within the second aperture when the rotatable knob is in contact with the handle portion corresponds to the maximum flow rate.

7. The sprayer of claim 1, wherein the trigger plunger is coupled to a power switch such that the power switch is turned ON when the trigger is moved toward the handle portion.

8. A sprayer for spraying a fluid comprising:

a sprayer body including a handle portion and a nozzle portion, the nozzle portion including a nozzle assembly that defines a fluid outlet, the nozzle assembly including a fluid conduit and a needle arranged within the fluid conduit and extending in an axial direction, the needle being movable to a plurality of positions between a closed position and a fully opened position, the needle closing the fluid outlet in the closed position and fully opening the fluid outlet in the fully opened position;

a fluid reservoir coupled to the sprayer body and in communication with the fluid outlet and fluid conduit;

a trigger assembly coupled to the nozzle assembly, the trigger assembly having a trigger that is configured to coordinate movement of the needle;

a flow adjustment mechanism coupled to the trigger assembly and configured to adjust a maximum flow rate setting of the sprayer by limiting movement of the trigger and the needle, the flow adjustment mechanism comprising a collar and a coupler, the collar being rotatably mounted on but axially fixed to the sprayer body, the coupler being threaded to the collar and non-rotatably coupled to the sprayer body such that rotation of the collar causes corresponding axial movement of the coupler; and a flow rate indicator coupled to the coupler for axial movement therewith, the flow rate indicator providing an indication of the maximum flow rate setting.

9. The sprayer of claim 8, wherein the coupler includes a first leg and a second leg, the first leg limiting movement of the trigger and the needle by acting as a mechanical stop for contacting a portion of the trigger assembly, and the flow rate indicator is fixed to the second leg.

10. The sprayer of claim 9, wherein the sprayer body includes an aperture, and wherein the flow rate indicator is movably disposed in the aperture, and wherein a position of the flow rate indicator within the aperture corresponds to an actual flow rate of the sprayer.

11. The sprayer of claim 10, wherein the collar includes a ridge that is arranged within a groove defined by the handle portion to inhibit movement of the collar in the axial direction.

12. The sprayer of claim 11, wherein the coupler is slidingly coupled to the nozzle portion.

13. The sprayer of claim 8, wherein the needle is biased to be in the closed position when the trigger assembly is not depressed.

14. A sprayer for spraying a fluid comprising:

a sprayer body including a handle portion and a nozzle portion, the sprayer body having an exterior surface and defining a flow indicator aperture that extends through the exterior surface, the nozzle portion including a nozzle assembly that defines a fluid outlet, the nozzle assembly including a fluid conduit and a needle arranged within the fluid conduit, the needle being movable to a plurality of positions between a closed position and a fully opened position, the needle closing the fluid outlet in the closed position and fully opening the fluid outlet in the fully opened position;

a fluid reservoir coupled to the sprayer body and in communication with the fluid outlet and fluid conduit;

a trigger assembly coupled to the nozzle assembly, the trigger assembly comprising a trigger that is configured to move the needle as the trigger is depressed;

a flow adjustment mechanism configured to limit movement of the needle in a needle opening direction; and a flow rate indicator arranged in the sprayer body and visible to a user of the sprayer through the flow indicator aperture such that a position of the flow rate indicator within the flow rate aperture corresponds to a flow rate of the sprayer.

15. The sprayer of claim 14, wherein the needle is biased to be in the closed position when the trigger is not depressed.

16. The sprayer of claim 14, further comprising a trigger plunger and a power switch for turning ON the sprayer, wherein the flow rate indicator is coupled to the trigger plunger and the trigger plunger is configured to turn the power switch ON when the trigger is depressed.

17. The sprayer of claim 16, wherein the flow adjustment mechanism comprises a rotatable knob that acts as a mechanical stop for the trigger assembly, wherein rotation of the rotatable knob adjusts the flow rate.

18. The sprayer of claim 14, wherein the flow adjustment mechanism includes a coupler coupled to a rotatable collar such that rotation of the collar moves the coupler in an axial direction, the flow rate indicator being coupled to the coupler.

19. The sprayer of claim 18, wherein the coupler includes a first leg and a second leg, the first leg limiting movement of the trigger assembly and the needle by acting as a mechanical stop for the trigger assembly and the second leg including the flow rate indicator.

* * * * *